S. BECKWITH.
Cultivator Teeth.
No. 100,713.
Patented March 15, 1870.
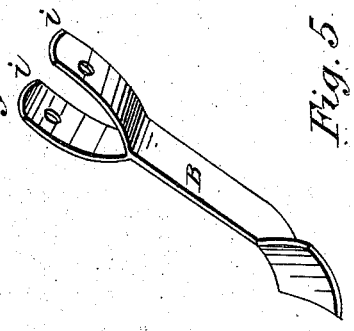
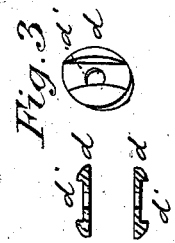
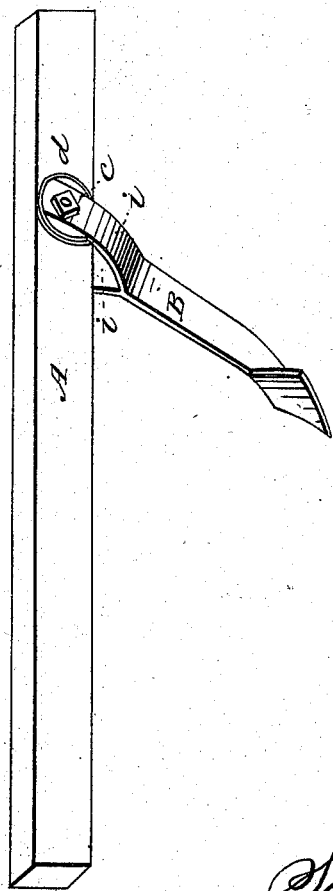
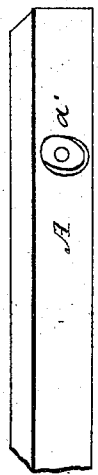
Witnesses:
L. W. Halsey
W. G. Ritch
Inventor:
Sanford Beckwith

UNITED STATES PATENT OFFICE.

SANFORD BECKWITH, OF OSHKOSH, WISCONSIN.

IMPROVEMENT IN CULTIVATOR-TEETH.

Specification forming part of Letters Patent No. 100,713, dated March 15, 1870.

*To all whom it may concern:*

Be it known that I, SANFORD BECKWITH, of the city of Oshkosh, State of Wisconsin, have invented a new and Improved Yielding Tooth for Cultivators; and I do hereby declare that the following is a full and exact description thereof, reference being had to the accompanying drawings, and to the letters of reference marked thereon, making a part of this specification.

The nature of my invention consists in providing a cultivator-bar with a cultivator-tooth constructed with a bracing or crotched head to clasp the cultivator-bar, a washer being inserted on each side of the bar between it and the head of the tooth, and the whole firmly bound together with a screw-bolt.

Figure 1 is a perspective view of the cultivator bar and tooth. Fig. 2 is a perspective view of the tooth with a bracing and crotched head, $i\ i$. Figs. 3 and 4 is a washer. Fig. 5 is a bolt. Fig. 6 is a fragment of the bar A with the seat of the washer.

A is a cultivator-bar. B is the cultivator-tooth with a braced dual head and bearings, $i\ i$. $d$ is a washer with a grooved seat, $d'$, for cultivator-tooth. $c$ is a bolt. $a'$ is a seat for the washer. The washer is inserted in the seats $a'$ on each side of the bar, the tooth B is inserted in the grooves of the washer $d'$, and the whole bound together by the bolt $c$. The resistance of the tooth is governed by the friction of the washer on the bar and by the tenacity with which the same is clasped to the bar by the bolt. Plain washers in place of grooved washers may be used at option without departing from the scope of my invention.

I disclaim a cultivator-tooth constructed in the manner and form specified in the patent of W. M. Hulbert, granted January 26, 1869; but

What I claim as my invention, and desire to secure by Letters Patent, is—

1. The cultivator-tooth B, with a bracing dual head, $i\ i$, arranged relatively to the washer $d$, bolt $c$, and cultivator-bar A, for the purposes set forth.

2. The washers $d$, provided with groove $d'$, when used in combination with tooth B, bar A, and bolt $c$.

SANFORD BECKWITH.

Witnesses:
L. W. HALSEY,
W. G. RITCH.